(12) United States Patent
Flynn et al.

(10) Patent No.: US 10,920,694 B2
(45) Date of Patent: Feb. 16, 2021

(54) MULTI-FUEL ENGINE SYSTEM

(71) Applicant: Transportation IP Holdings, LLC, Norwalk, CT (US)

(72) Inventors: Paul Lloyd Flynn, Lawrence Park, PA (US); Aninda Bhattacharya, Bangalore (IN); Ganesasubramanian Murugesan, Bangalore (IN); Milan Palinda Karunaratne, Anaheim, CA (US); Daniel Cullen, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 18 days.

(21) Appl. No.: 16/292,103

(22) Filed: Mar. 4, 2019

(65) Prior Publication Data

US 2019/0195151 A1  Jun. 27, 2019

Related U.S. Application Data

(62) Division of application No. 14/967,062, filed on Dec. 11, 2015, now Pat. No. 10,316,772.

(60) Provisional application No. 62/092,313, filed on Dec. 16, 2014.

(51) Int. Cl.
*F02D 41/00* (2006.01)
*F02D 41/14* (2006.01)
*G01M 15/11* (2006.01)
*F02D 19/06* (2006.01)

(52) U.S. Cl.
CPC ....... *F02D 41/008* (2013.01); *F02D 19/0623* (2013.01); *F02D 41/0025* (2013.01); *F02D 41/0097* (2013.01); *F02D 41/1498* (2013.01); *G01M 15/11* (2013.01); *F02D 2200/101* (2013.01); *F02D 2200/1015* (2013.01); *Y02T 10/30* (2013.01)

(58) Field of Classification Search
CPC ........... F02D 19/0623; F02D 2200/101; F02D 2200/1015; F02D 41/0025; F02D 41/008; F02D 41/0097; F02D 41/1498; G01M 15/11; Y02T 10/36
See application file for complete search history.

(56) References Cited

U.S. PATENT DOCUMENTS

| 4,424,709 A | 1/1984 | Meier, Jr. et al. |
| 4,435,774 A | 3/1984 | Claasen et al. |
| 5,023,906 A | 6/1991 | Novas |

(Continued)

FOREIGN PATENT DOCUMENTS

| CN | 101331305 A | 12/2008 |
| CN | 103388528 A | 11/2013 |

(Continued)

OTHER PUBLICATIONS

Australian Patent Office, Examination Report Issued in Application No. 2015268726, dated Aug. 22, 2016, 11 pages.

(Continued)

*Primary Examiner* — Carl C Staubach
(74) *Attorney, Agent, or Firm* — McCoy Russell LLP

(57) ABSTRACT

Various methods and systems are provided for an engine capable of receiving liquid and gaseous fuel. In one example, cylinder misfire may be identified based on a misfire monitor. The misfire monitor may detect misfire based on signals from a crankshaft sensor.

9 Claims, 12 Drawing Sheets

(56) References Cited

U.S. PATENT DOCUMENTS

| | | | |
|---|---|---|---|
| 5,303,158 | A | 4/1994 | Kuroda |
| 5,633,456 | A | 5/1997 | Stander |
| 5,862,507 | A | 1/1999 | Wu et al. |
| 5,935,189 | A | 8/1999 | Park |
| 8,256,278 | B2 | 9/2012 | Lee et al. |
| 8,428,848 | B2 | 4/2013 | Santoso |
| 8,626,371 | B2 | 1/2014 | Kumar et al. |
| 9,951,703 | B2 | 4/2018 | Pathan et al. |
| 10,316,772 | B2 * | 6/2019 | Flynn .................. F02D 41/008 |
| 2002/0146529 | A1 | 10/2002 | Lang et al. |
| 2004/0190663 | A1 | 9/2004 | Carsello et al. |
| 2005/0075781 | A1 | 4/2005 | Mizuno et al. |
| 2006/0101902 | A1 | 5/2006 | Christensen |
| 2007/0157713 | A1 | 7/2007 | Tsukamoto et al. |
| 2008/0276697 | A1 | 11/2008 | Ostman |
| 2010/0043746 | A1 | 2/2010 | Hartmann et al. |
| 2013/0073174 | A1 | 3/2013 | Worden et al. |
| 2013/0092439 | A1 | 4/2013 | Mauldin et al. |
| 2013/0096803 | A1 | 4/2013 | Ikeda |
| 2013/0275021 | A1 | 10/2013 | Malaczynski et al. |
| 2014/0074380 | A1 * | 3/2014 | Fisher ................ F02D 19/0647 701/104 |
| 2014/0257674 | A1 | 9/2014 | Assaf et al. |
| 2015/0369687 | A1 | 12/2015 | Furman et al. |
| 2016/0146704 | A1 | 5/2016 | Ejakov |
| 2016/0333807 | A1 | 11/2016 | Pathan et al. |
| 2017/0211538 | A1 | 7/2017 | Duan et al. |
| 2017/0314481 | A1 | 11/2017 | Karunaratne et al. |
| 2017/0314498 | A1 | 11/2017 | Pathan |
| 2018/0087460 | A1 | 3/2018 | Pathan et al. |

FOREIGN PATENT DOCUMENTS

| | | |
|---|---|---|
| CN | 104121090 A | 10/2014 |
| CN | 104179585 A | 12/2014 |
| EP | 1559898 A1 | 8/2005 |
| EP | 2843219 A1 | 3/2015 |
| GB | 2260194 A | 4/1993 |
| JP | S56143081 A | 11/1981 |
| JP | H05252545 A | 9/1993 |
| JP | H11159360 A | 6/1999 |
| JP | 2001098999 A | 4/2001 |
| JP | 2004108154 A | 4/2004 |
| JP | 2006523425 A | 10/2006 |
| JP | 2007071191 A | 3/2007 |
| JP | 2009229583 A | 10/2009 |
| JP | 2016070131 A | 5/2016 |
| WO | 8400417 A1 | 2/1984 |
| WO | 2010005651 A2 | 1/2010 |
| WO | 2013161008 A1 | 10/2013 |

OTHER PUBLICATIONS

Japanese Patent Office, Office Action Issued in Application No. 2015240694, dated May 8, 2017, 13 pages.

State Intellectual Property Office of the People's Republic of China, Office Action and Search Report Issued in Application 201510941332.4, dated Oct. 9, 2017, 10 pages. (Submitted with Partial Translation).

Japanese Patent Office, Office Action Issued in Application No. 2015240694, dated Jan. 18, 2018, 8 pages.

* cited by examiner

MULTI-FUEL ENGINE SYSTEM

CROSS REFERENCE TO RELATED APPLICATIONS

This application is a divisional of U.S. Non-Provisional Patent Application No. 14/967,062 entitled "MULTI-FUEL ENGINE SYSTEM" and filed on Dec. 11, 2015. U.S. Non-Provisional Patent Application No. 14/967,062 claims priority to U.S. Patent Application No. 62/092,313, filed Dec. 16, 2014. The entire contents of each of the above-listed applications are hereby incorporated by reference for all purposes.

FIELD

Embodiments of the subject matter disclosed herein relate to an engine, engine components, and an engine system, for example.

BACKGROUND

In light of its favorable energy content, natural gas may be used as a fuel source for an engine. To obtain fuel economy benefits and meet power output demands over a wide range of operating conditions, some engines may be configured to operate with both natural gas and a liquid fuel, such as diesel. In such multi-fuel engines, the natural gas/intake air mixture in each cylinder of the engine may be combusted in response to an injection of liquid fuel. While some operating conditions may benefit from a relatively high ratio of natural gas to liquid fuel (e.g., 90% natural gas or greater), the amount of natural gas used in a given engine cycle may be limited by the lowest-possible amount of liquid fuel each fuel injector is capable of injecting.

BRIEF DESCRIPTION

In one embodiment, a system includes an engine having a plurality of cylinders with pistons coupled to a crankshaft, a crankshaft speed sensor, and a controller. The controller is configured to measure one or more torsional vibration orders of the engine based on signals from the crankshaft speed sensor, determine an amplitude of the one or more torsional vibration orders, and when the amplitude is greater than a threshold amplitude, indicate misfire in at least one of the plurality of cylinders.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
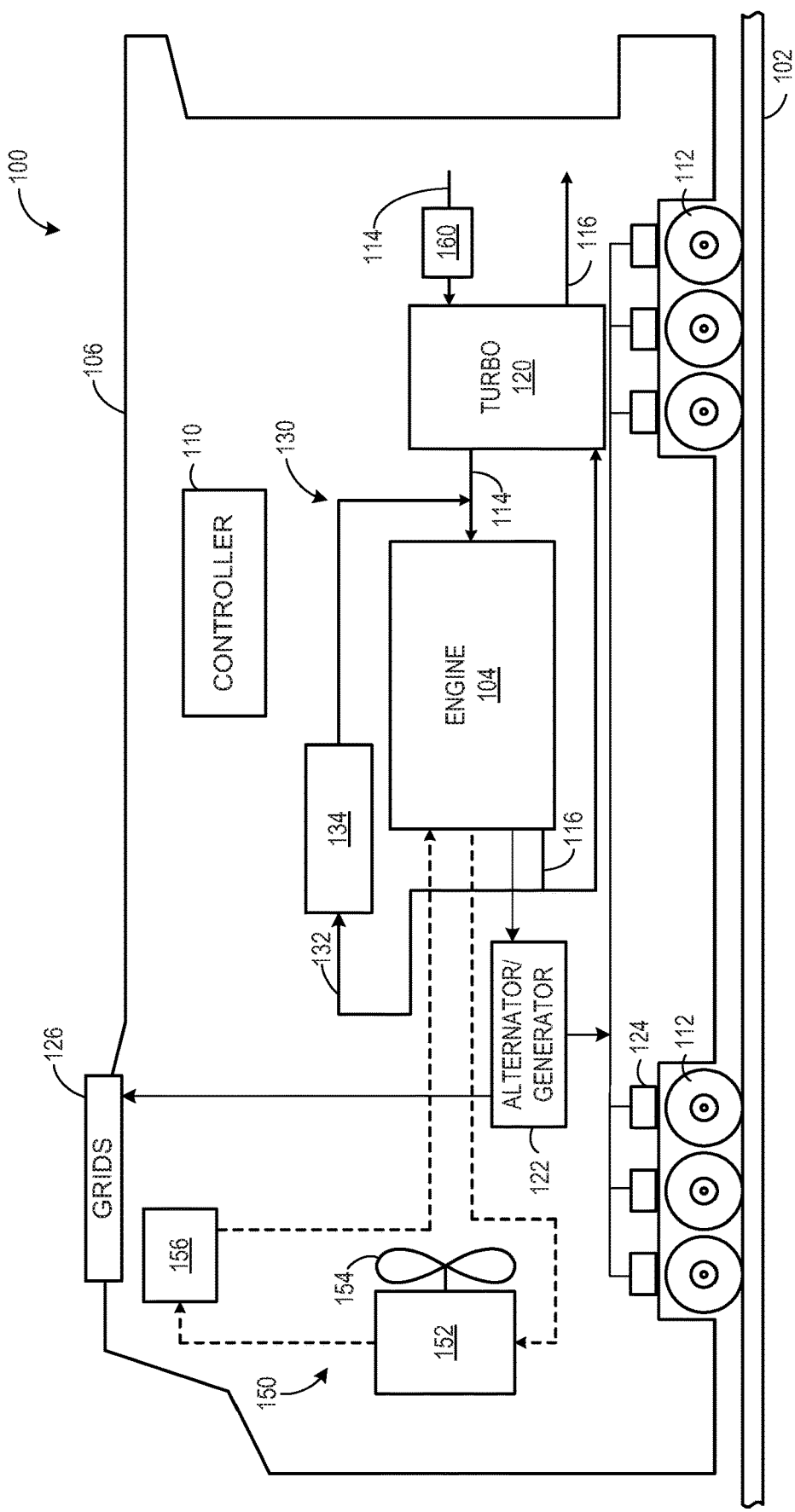
FIG. 1 shows a schematic diagram of an embodiment of a vehicle with an engine.

The following description relates to various embodiments of tuning each liquid fuel injector of an engine in order to enable operation at a highest-possible ratio of gaseous fuel to liquid fuel (also referred to as a substitution ratio) for each cylinder of the engine. The tuning of each liquid fuel injector may be based on detection of misfire in each cylinder during the tuning process. Misfire in each cylinder may be detected using a misfire monitor that detects torsional oscillations using signals from a crankshaft sensor, for example.

As explained above, it may be challenging to control the combustion of a multi-fuel engine at high gaseous fuel utilization (e.g., low liquid fuel usage) because liquid fuel injectors may have a non-linear delivery characteristic. As the liquid fuel delivery is ramped down to allow higher gaseous fuel usage, a standard liquid fuel injector may suddenly reduce its flow at about 15% maximum injection rate, referred to as the turn down point. Each injector in a multi-cylinder engine may have its own turn down point. If the injectors are all treated equally, the total gaseous fuel usage will be determined by the injector that turns off at the highest fuel delivery quantity. As such, if the injectors have a turn down point that range from 5% to 15%, the engine may be limited to a substitution ratio of 85% (e.g., 85% gaseous fuel, 15% liquid fuel).

According to embodiments disclosed herein, a misfire monitor may be initiated that detects poor combustion in individual cylinders as the liquid fuel injection quantity is reduced, and then tunes the lowest possible liquid fuel injection rate for each cylinder individually to provide stable combustion in each cylinder. The multi-fuel engine may be designed to run at very high gaseous fuel substitution ratio, such as 99% gaseous fuel and 1% liquid fuel by energy content. During the tuning process, the engine may start combusting all liquid fuel and then add gaseous fuel to a safe level for all cylinders, such as 80% gaseous fuel. The combustion roughness will be measured by the misfire monitor. In some examples, the misfire monitor may be a torsional vibration order monitor in the controller that monitors one or more torsional vibration orders, such as the half-order. When all cylinders are firing evenly, the half-order level will be low. The liquid fuel injection quantity of each cylinder will be reduced until its misfire is detected by the half-order monitor. Then the liquid fuel injection quantity will be increased to gain proper combustion of that cylinder. This process will be repeated on each cylinder to tune the entire engine to the lowest safe level of liquid fuel usage. The stability of combustion will be monitored by the half-order detection system, and if any cylinder starts to misfire, the liquid fuel injection rate can be increased on that individual cylinder.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a self-propelled rail vehicle, and more broadly, as an example of a mobile platform, supporting a system incorporating an embodiment of the invention.

Before further discussion of the approach for providing tuning liquid fuel injections in a multi-fuel engine, an example of a platform is disclosed in which an engine may be configured for a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle 106 includes an engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake passage 114. The intake passage 114 receives ambient air from an air filter 160 that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may additionally combust fuel including gasoline, kerosene, natural gas, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 122 and electric traction motors 124. For example, the engine 104 is a diesel and/or natural gas engine that generates a torque output that is transmitted to the generator 122 which is mechanically coupled to the engine 104. In one embodiment herein, engine 104 is a multi-fuel engine operating with diesel fuel and natural gas, but in other examples engine 104 may use various combinations of fuels other than diesel and natural gas.

The generator 122 produces electrical power that may be stored and applied for subsequent propagation to a variety of downstream electrical components. As an example, the generator 122 may be electrically coupled to a plurality of traction motors 124 and the generator 122 may provide electrical power to the plurality of traction motors 124. As depicted, the plurality of traction motors 124 are each connected to one of a plurality of wheels 112 to provide tractive power to propel the rail vehicle 106. One example configuration includes one traction motor per wheel set. As depicted herein, six pairs of traction motors correspond to each of six pairs of motive wheels of the rail vehicle. In another example, alternator/generator 122 may be coupled to one or more resistive grids 126. The resistive grids 126 may be configured to dissipate excess engine torque via heat produced by the grids from electricity generated by alternator/generator 122.

In some embodiments, the vehicle system 100 may include a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

In some embodiments, the vehicle system 100 may further include an aftertreatment system (illustrated in FIG. 3 as aftertreatment device 314) coupled in the exhaust passage upstream and/or downstream of the turbocharger 120. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system 100 may further include an exhaust gas recirculation (EGR) system 130 coupled to the engine 104, which routes exhaust gas from an exhaust passage 116 of the engine 104 to the intake passage 114 downstream of the turbocharger 120. In some embodiments, the exhaust gas recirculation system 130 may be coupled exclusively to a group of one or more donor cylinders of the engine (also referred to a donor cylinder system). As depicted in FIG. 1, the EGR system 130 includes an EGR passage 132 and an EGR cooler 134 to reduce the temperature of the exhaust gas before it enters the intake passage 114. By introducing exhaust gas to the engine 104, the amount of available oxygen for combustion is decreased, thereby reducing the combustion flame temperatures and reducing the formation of nitrogen oxides (e.g., $NO_x$).

In some embodiments, the EGR system 130 may further include an EGR valve for controlling an amount of exhaust gas that is recirculated from the exhaust passage 116 of the engine 104 to the intake passage 114 of engine 104. The EGR valve may be an on/off valve controlled by the controller 110, or it may control a variable amount of EGR, for example. As shown in the non-limiting example embodiment of FIG. 1, the EGR system 130 is a high-pressure EGR system. In other embodiments, the vehicle system 100 may additionally or alternatively include a low-pressure EGR system, routing EGR from downstream of the turbine to upstream of the compressor.

As depicted in FIG. 1, the vehicle system 100 further includes a cooling system 150. The cooling system 150 circulates coolant through the engine 104 to absorb waste engine heat and distribute the heated coolant to a heat exchanger, such as a radiator 152. A fan 154 may be coupled to the radiator 152 in order to maintain an airflow through the radiator 152 when the vehicle 106 is moving slowly or stopped while the engine is running. In some examples, fan speed may be controlled by a controller, such as controller 110. Coolant which is cooled by the radiator 152 enters a tank 156. The coolant may then be pumped by a water, or coolant, pump (not shown) back to the engine 104 or to another component of the vehicle system, such as the EGR cooler.

The rail vehicle 106 further includes an engine controller 110 (referred to hereafter as the controller) to control various components related to the rail vehicle 106. As an example, various components of the vehicle system may be coupled to the controller 110 via a communication channel or data bus. In one example, the controller 110 includes a computer control system. The controller 110 may additionally or alternatively include a memory holding non-transitory computer readable storage media (not shown) including code for enabling on-board monitoring and control of rail vehicle operation.

The controller 110 may receive information from a plurality of sensors and may send control signals to a plurality of actuators. The controller 110, while overseeing control and management of the rail vehicle 106, may be configured to receive signals from a variety of engine sensors, as further elaborated herein, in order to determine operating parameters and operating conditions, and correspondingly adjust various engine actuators to control operation of the rail vehicle 106. For example, the engine controller 110 may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, gas temperature in the EGR cooler, or the like. Correspondingly, the controller 110 may control the rail vehicle 106 by sending commands to various components such as the traction motors 124, the alternator/generator 122, cylinder valves, fuel injectors, a notch throttle, or the like. Other actuators may be coupled to various locations in the rail vehicle.

Figure 2:
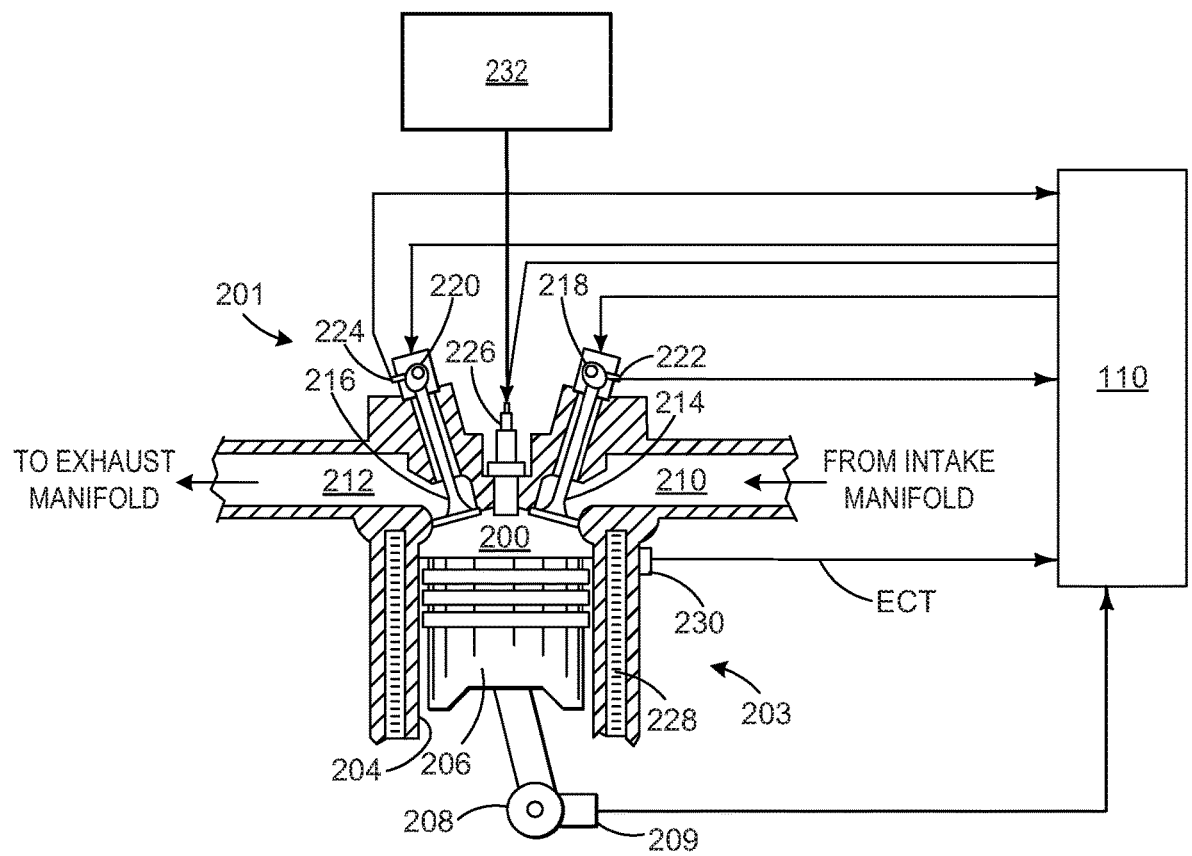
FIG. 2 shows a schematic diagram of a cylinder of the engine of FIG. 1.

FIG. 2 depicts an embodiment of a combustion chamber, or cylinder 200, of a multi-cylinder internal combustion engine, such as the engine 104 described above with reference to FIG. 1. Cylinder 200 may be defined by a cylinder head 201, housing the intake and exhaust valves and fuel injector, described below, and a cylinder block 203. In some examples, each cylinder of the multi-cylinder engine may include a separate cylinder head coupled to a common cylinder block.

The engine may be controlled at least partially by a control system including controller 110 which may be in further communication with a vehicle system, such as the vehicle system 100 described above with reference to FIG. 1. As described above, the controller 110 may further receive signals from various engine sensors including, but not limited to, engine speed from crankshaft speed sensor 209, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. In one example, crankshaft speed sensor may be a Hall effect sensor, variable reluctance sensor, or linear variable differential transducer configured to determine crankshaft speed based on the speed of one or more teeth on a wheel of the crankshaft. Correspondingly, the controller 110 may control the vehicle system by sending commands to various components such as alternator, cylinder valves, throttle, fuel injectors, etc.

The cylinder (i.e., combustion chamber) 200 may include combustion chamber walls 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake including an intake runner 210. The intake runner 210 receives intake air via an intake manifold. The intake runner 210 may communicate with other cylinders of the engine in addition to the cylinder 200, for example, or the intake runner 210 may communicate exclusively with the cylinder 200.

Exhaust gas resulting from combustion in the engine is supplied to an exhaust including an exhaust runner 212. Exhaust gas flows through the exhaust runner 212, to a turbocharger in some embodiments (not shown in FIG. 2) and to atmosphere, via an exhaust manifold. The exhaust runner 212 may further receive exhaust gases from other cylinders of the engine in addition to the cylinder 200, for example.

Each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 110 via an actuator 218. Similarly, the exhaust valve 216 may be controlled by the controller 110 via an actuator 220. During some conditions, the controller 110 may vary the signals provided to the actuators 218 and 220 to control the opening and closing of the respective intake and exhaust valves. The position of the intake valve 214 and the exhaust valve 216 may be determined by respective valve position sensors 222 and 224, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a high-pressure fuel system including a fuel tank 232, fuel pumps, and a fuel rail (not shown). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). Further, as explained in more detail below, each cylinder of the engine may be configured to receive gaseous fuel (e.g., natural gas) alternative to or in addition to diesel fuel. The gaseous fuel may be provided to cylinder 200 via the intake manifold, as explained below, or other suitable delivery mechanism.

Figure 3:
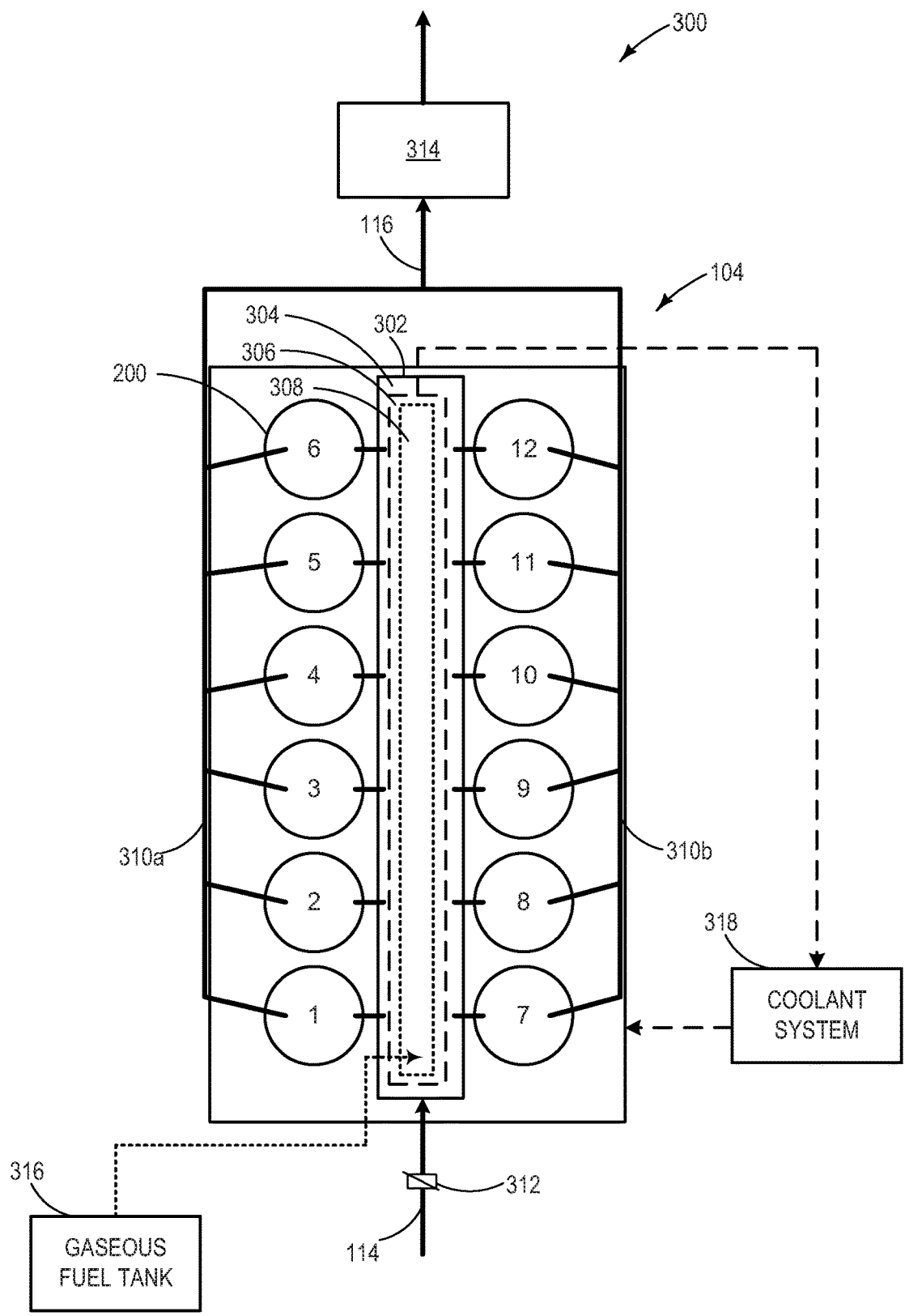
FIG. 3 shows a schematic diagram of an engine system including the engine of FIG. 1.

FIG. 3 shows a schematic diagram of an engine system 300 including multi-cylinder engine 104 having a plurality of cylinders 200. Thus, the engine system 300 includes the engine 104 described above with respect to FIG. 1. The engine 104 receives intake air for combustion from intake manifold 302. Intake manifold 302 receives intake air from intake passage 114, which receives ambient air from an air filter (shown in FIG. 1) that filters air from outside of a vehicle in which the engine 104 may be positioned. The flow of intake air into intake manifold 302 may be controlled by throttle 312, the position of which may be controlled by controller 110.

In the embodiment depicted in FIG. 3, the engine 104 is a V-12 engine having twelve cylinders. In other examples, the engine may be a V-6, V-8, V-10, V-16, I-4, I-6, I-8, opposed 4, or another engine type. Due to the vee configuration of the engine, the engine includes a first cylinder bank having six cylinders (e.g., cylinders 1-6) and a second cylinder bank having six cylinders (e.g., cylinders 7-12). Intake manifold 302 is arranged between the two cylinder banks and is configured to supply intake air to each cylinder of each bank via a plurality of intake runners. While not shown in FIG. 3, each intake runner is coupled to a separate cylinder head that at least partially defines a cylinder. Thus, intake air that flows through the intake manifold is distributed to a plurality of intake runners, each fluidically coupled to a separate cylinder head of the engine.

Intake manifold 302 is configured to supply intake air to the cylinders of the engine, as described above. However, intake manifold 302 includes further passageways for draining coolant from the engine and delivering gaseous fuel to the engine. As such, intake manifold 302 includes a first passage 304 configured to flow intake air. First passage 304 is coupled to the plurality of intake runners. First passage 304 receives intake air from intake passage 114.

To drain coolant from the engine, intake manifold 302 includes a second passage 306. Second passage 306 receives coolant that is directed out of each cylinder head, for example, and the second passage directs the coolant back to the general engine coolant system 318. The engine coolant system 318 may include one or more coolant components, such as a radiator (e.g., radiator 152 of FIG. 1), coolant tank (e.g., tank 156), cooling lines, pumps and/or other components. Thus, coolant from the engine coolant system is pumped to the engine 104, where it flows through one or more jackets of the cylinder block and/or cylinder head (e.g., coolant sleeve 228) to cool the engine. The coolant then drains out of the engine via drainage lines leading out from each cylinder head to the second passage 306, and the coolant is returned to the engine coolant system.

In some modes of operation, engine 104 may operate with both liquid fuel combustion (e.g., diesel fuel) and gaseous fuel (e.g., natural gas) combustion. While liquid fuel is delivered to each cylinder according to the configuration described above with respect to FIG. 2, gaseous fuel may be delivered to each cylinder via a third passage 308 of the intake manifold 302. As shown in FIG. 3, the third passage 308 of the intake manifold 302 may receive a supply of gaseous fuel from a gaseous fuel tank 316, via one or more gaseous fuel lines, pumps, pressure regulators, etc. In some embodiments, gaseous fuel tank 316 may be located remotely from engine 104, such as on a different rail car (e.g., on a fuel tender car), and the gaseous fuel may be supplied to the engine 104 via one or more fuel lines that traverse the separate cars. However, in other embodiments gaseous fuel tank 316 may be located on the same vehicle as engine 104. The third passage 308 may include a plurality of gas admission valves, each configured to supply gaseous fuel from the third passage 308 to a respective cylinder head.

Exhaust gas resulting from combustion in the engine 104 is supplied to an exhaust passage 116, where the exhaust is treated by aftertreatment device 314 and/or flows through one or more turbochargers before exiting to atmosphere. In the configuration illustrated in FIG. 3, each cylinder bank has an exhaust manifold. For example, exhaust manifolds 310a and 310b are illustrated in FIG. 3. Each exhaust manifold receives exhaust released from each cylinder of a respective cylinder bank (via an exhaust runner of the respective cylinder head, such as exhaust runner 212 of FIG. 2). Each exhaust manifold 310a, 310b directs exhaust to the common exhaust passage 116.

Thus, the engine systems described above provide for a plurality of cylinders, each cylinder including a liquid fuel injector configured to inject a liquid fuel (e.g., diesel). Further, each cylinder is configured to receive gaseous fuel (e.g., natural gas). A gaseous fuel-air mix in a cylinder may be combusted via injection of liquid fuel from a liquid fuel injector. The engine may be configured to operate over a wide range of gaseous fuel and liquid fuel amounts, referred to herein as a substitution ratio. For example, under some conditions it may be desirable to operate the engine with a substitution ratio of zero, wherein all combustion energy is derived from liquid fuel combustion. Under other conditions, it may be desirable to operate the engine with a substitution ratio of greater than zero, wherein at least some of the combustion energy is derived from gaseous fuel.

Figure 8:
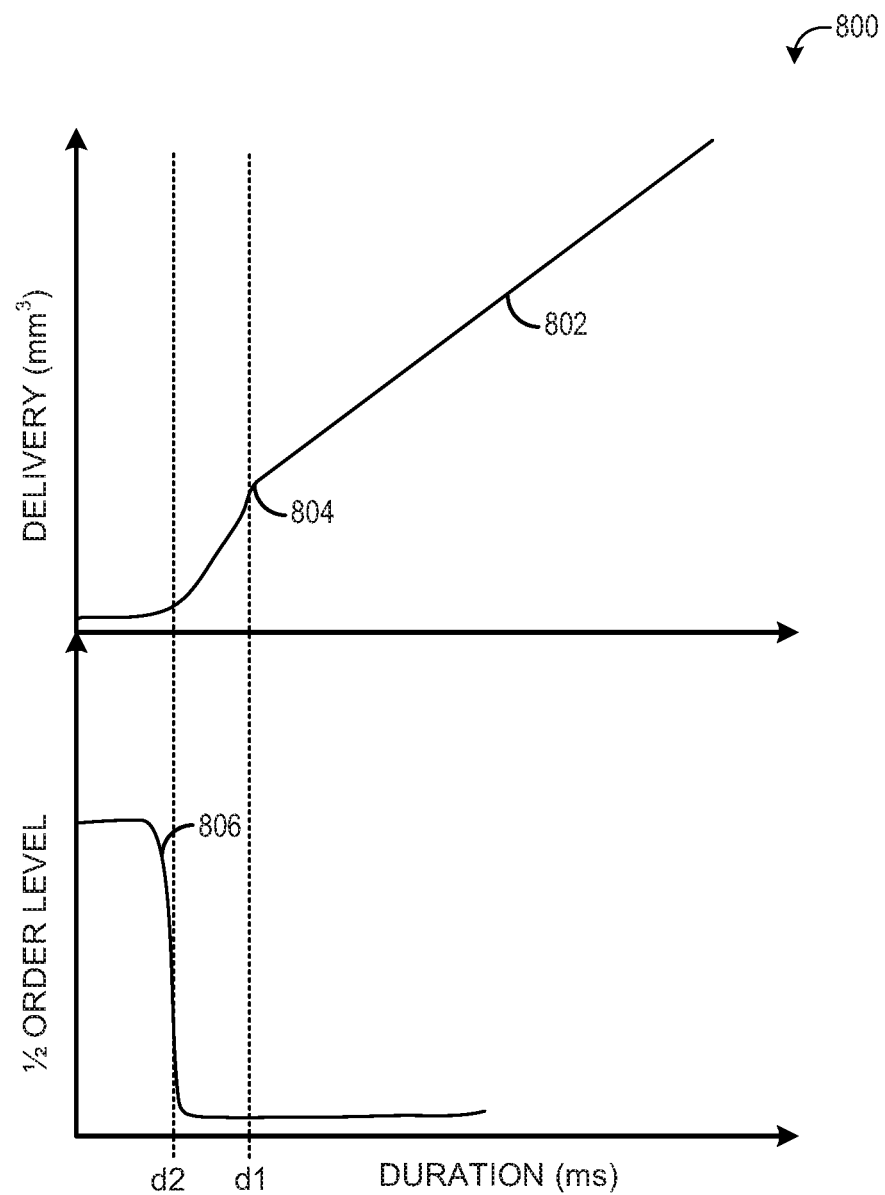
FIGS. 8-9 illustrate example injector delivery curves.

As explained above, in some conditions it may be desirable to operate the engine with a substation ratio of nearly 100%. As the combustion of the gaseous fuel relies on the presence of at least some liquid fuel, even during operation with high substitution ratios, the liquid fuel injectors may still be operated to provide some liquid fuel to each cylinder. However, each liquid fuel injector may have a minimum liquid fuel injection quantity, referred to as the turn down point, below which the injection quantity is not linearly correlated with the duration at which the injector is open (also referred to as the open duration). FIG. 8 is a diagram 800 illustrating an example injector delivery curve 802 for a liquid fuel injector, showing that above a first injector open duration d1 (where duration is plotted on the horizontal axis), the fuel injection amount (e.g., volume, plotted on the vertical axis) increases linearly with increasing duration. However, below this point, referred to as the turn down point 804, the fuel delivery quantity may not change linearly with changing duration, e.g., the quantity may decrease at a greater rate than the duration. As shown by combustion curve 806, at a second duration d2 below the turn down point, stable combustion may cease and misfire may occur, due to the small amount of liquid fuel injected. The misfire may be detected based on ½ order frequency component level as determined by a ½ order misfire monitor, explained below.

Figure 9:
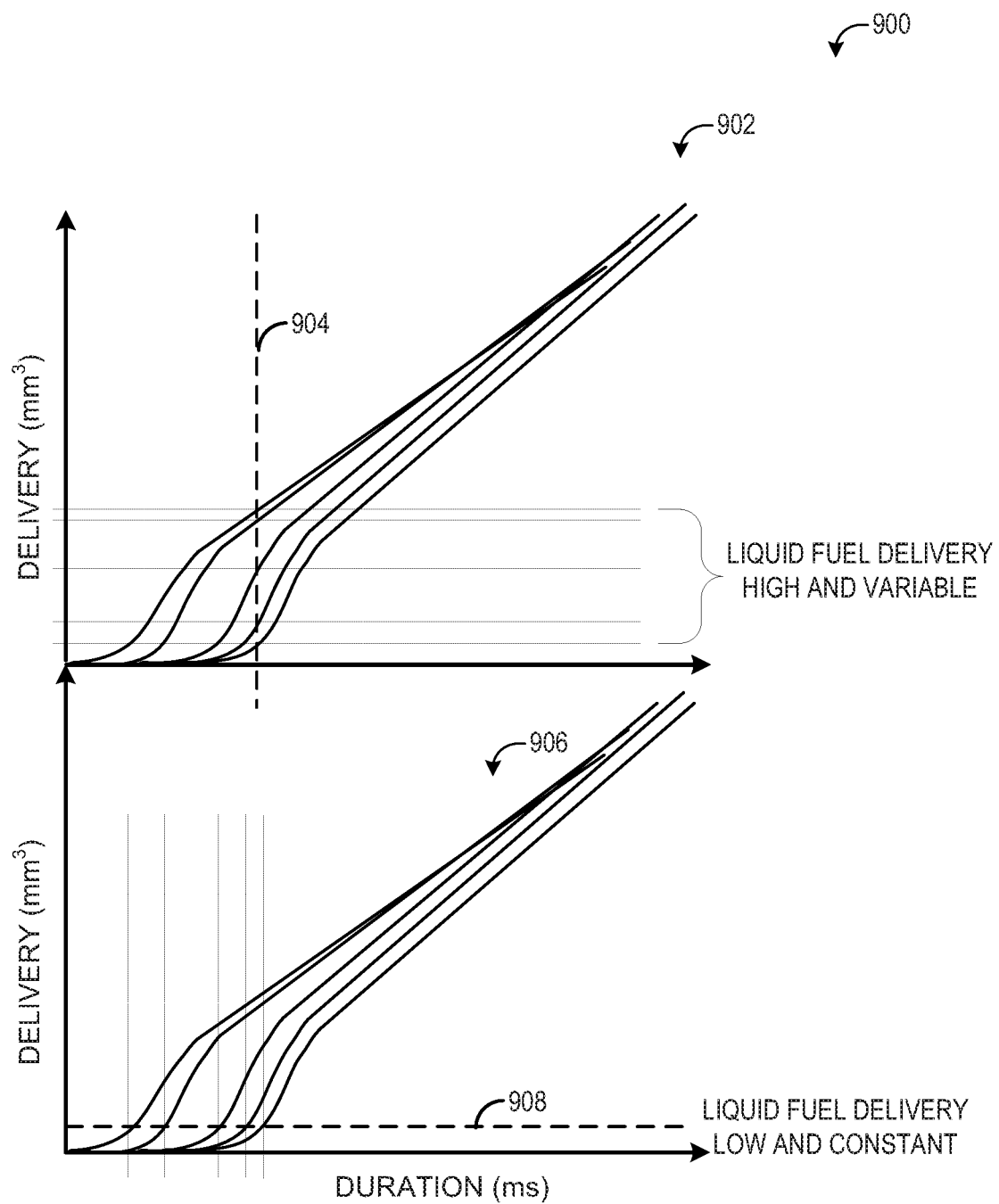

The turn down point of each individual injector may vary. For example, FIG. 9 is a diagram 900 showing a plurality of injector delivery curves 902 for a plurality of liquid fuel injectors. As illustrated by the plurality of injector delivery curves 902, for a given set of injectors, the turn down points may vary considerably. To ensure combustion stability, each fuel injector may typically be operated based on the highest turn down point of all the cylinders, or based on the highest duration of injector opening that ensures stable combustion. As shown by curves 902, if each injector is operated at the same duration (such as the duration needed to produce stable combustion in the injector with the highest turn down point, represented in FIG. 9 by line 904), a highly variable quantity of liquid fuel will be delivered among injectors. Such operation may lower the amount of gaseous fuel the engine can operate with. For example, the injector with the lowest turn down point may be operated at a duration much higher than the lowest duration needed to sustain combustion for that cylinder.

As will be described in more detail below, the lowest duration each injector can be operated at and still maintain combustion stability may be determined during a tuning routine. The fuel delivery quantity of each injector may be based on the duration that each is injector is open. As such, the fuel quantity and open duration may each be referred to when describing the tuning routine. For simplicity in description, the open duration will be used for the remainder of the description.

The tuning routine may include serially ramping down the open duration for each injector and monitoring for misfire. Once misfire is detected, the open duration of the injector of the misfiring cylinder may be ramped up until misfire ceases. That open duration may then be set as the lowest open duration that injector is capable of safely operating at. When very high levels of gaseous fuel are requested (e.g., 99%), that injector may then be operated at its tuned lowest open duration. This process may be repeated for each cylinder individually. As a result, when very high levels of gaseous fuel are requested (e.g., 99% gaseous fuel), each injector may be operated at a different duration, resulting in the same liquid fuel quantity delivered. This is illustrated by the plurality of injector delivery curves 906 of FIG. 9, where each injector is operated at a different duration resulting in the same fuel delivery volume 908.

Figure 4:
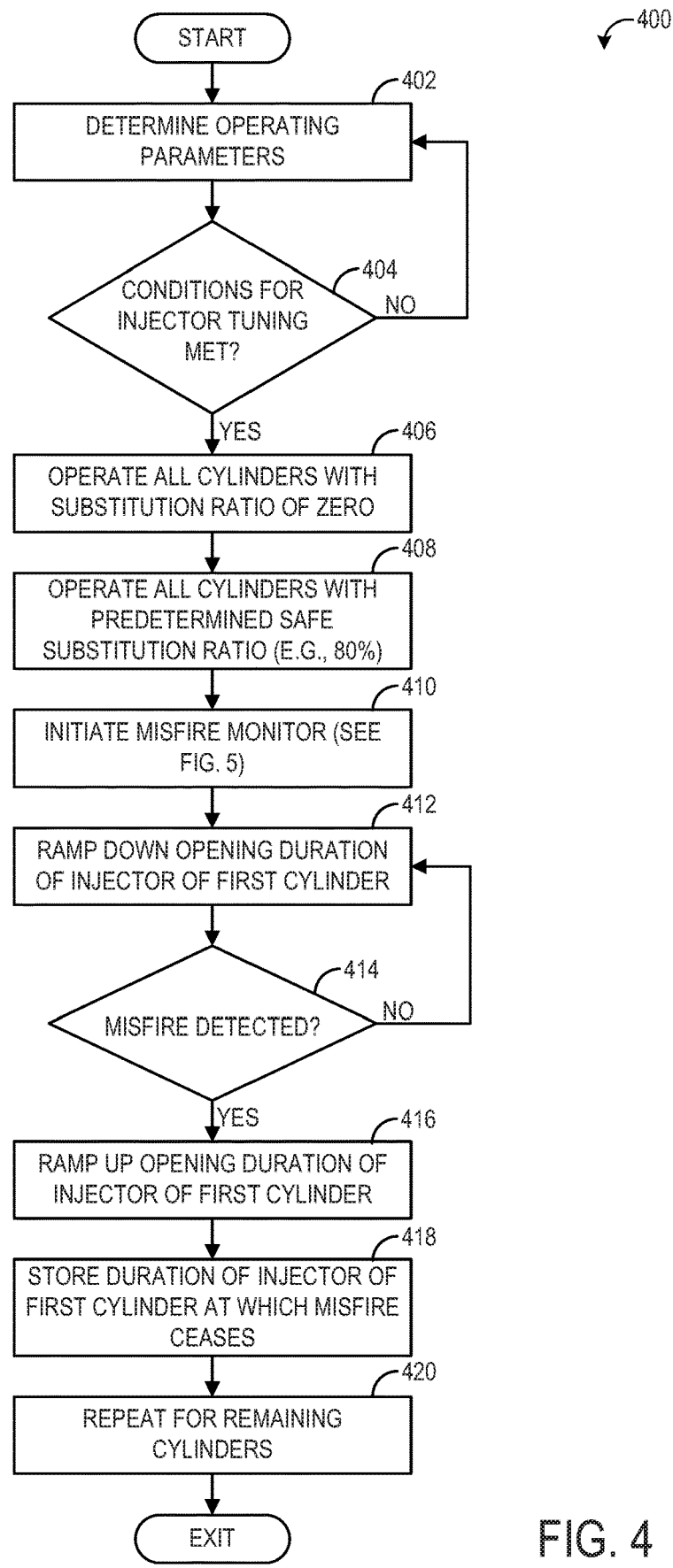
FIG. 4 is a high level flow chart illustrating a method for tuning a plurality of cylinders.

Turning now to FIG. 4, a method 400 for tuning a plurality of liquid fuel injectors of an engine (such as engine 104 of FIGS. 1-3) is illustrated. Method 400 may be carried out by a controller, such as controller 110 of FIGS. 1-3, according to non-transitory instructions stored thereon. At 402, method 400 includes determining engine operating parameters. The determined operating parameters may include, but are not limited to, engine speed, engine torque demand, engine temperature, and other operating parameters. At 404, method 400 includes determining if conditions for performing the injector tuning are met. The conditions for performing the injector tuning may include the tuning routine having not been performed prior (e.g., during the first operating period after manufacture of the engine, or following maintenance), or a threshold duration (of time, engine cycles, vehicle distance traveled, etc.) having lapsed since a prior tuning routine was performed.

The tuning routine entry conditions may also include operating conditions that permit a high level of gaseous fuel usage (e.g., near 100%). Engines configured to operate with both liquid and gaseous fuel may be operated with as much gaseous fuel as possible while still maintaining requested engine power. For example, in standard liquid-fueled engines, such as diesel engines, 100% of produced engine power may be derived from combustion of diesel fuel. In multi-fuel engines, a portion of the engine power may be derived from gaseous fuel while the remaining engine power may be derived from liquid fuel. For example, as much as 99% of produced engine power may be derived from combustion of gaseous fuel, with the remaining 1% of power derived from the combustion of diesel fuel. The amount of gaseous fuel "substituted" for the liquid fuel may be referred to as a substitution ratio. The substitution ratio may reflect the portion of engine power derived from gaseous fuel. For example, a substitution ratio of 80 indicates 80% of the power is derived from gaseous fuel, while a substitution ratio of 50 indicates 50% of the power is derived from gaseous fuel. A substitution ratio of 0 indicates liquid-only operation.

The substitution ratio may be set based on engine temperature, desired fuel type, notch throttle position, relative fuel levels in each fuel tank (e.g., if the level of gaseous fuel is below a threshold, more liquid fuel may be used), vehicle location (e.g., whether the vehicle is in a tunnel), and/or other parameters. Thus, the entry conditions may include engine temperature, throttle position, vehicle location, etc., each being in a range that allows for operation at high gaseous fuel utilization (e.g., 99%).

If the entry conditions have not been met, method 400 continues to monitor operating conditions at 402. If the conditions have been met, method 400 proceeds to 406 to operate all cylinders of the engine with a substitution ratio of zero (e.g., no gaseous fuel utilization). Then, at 408, all cylinders are operated at a predetermined safe substitution ratio, such as 80. The predetermined safe substitution ratio may include a level of gaseous fuel utilization that is known to produce stable (e.g., no misfires) combustion.

At 410, a misfire monitor is initiated to monitor for cylinder misfire. The misfire monitor will be described in more detail below with respect to FIG. 5. Briefly, the misfire monitor may detect misfire in one or more cylinders based on half-order or higher torsional oscillations produced by the engine and measured by a crankshaft speed sensor.

At 412, method 400 includes ramping down the open duration of the injector of a first cylinder of the engine. The open duration may be continuously ramped down, or ramped down in a step-wise manner, at a suitable rate. During the ramping down of the duration that the injector is open, the misfire monitor will be operating in order to determine if misfire occurs in the first cylinder, which may indicate that the liquid fuel injection quantity has dropped to a level that does not sustain combustion.

Thus, at 414, method 400 includes determining if misfire in the first cylinder is detected. If no misfire is detected, method 400 loops back to 412 to continue to ramp down the open duration of the injector. If misfire is detected, method 400 proceeds to 416 to ramp up the open duration of the injector of the first cylinder. The open duration of the injector may be ramped up until the misfire monitor ceases to detect misfire in the first cylinder. At 418, the open duration of the injector of the first cylinder at which misfire ceases is stored, and at 420, the tuning process is repeated for the remaining cylinders (e.g., the open duration of an injector of a second cylinder is ramped down while the substitution ratio of the remaining cylinders is held steady at the predetermined safe level, the misfire monitor indicates when misfire is detected in the second cylinder, the open duration of the injector of the second cylinder is ramped up until misfire ceases, and the duration at which misfire ceases is stored for the injector of the second cylinder).

After the tuning routine has been carried out on all injectors of all cylinders, when operating conditions permit engine operation with nearly only gaseous fuel (e.g., only enough liquid fuel to sustain combustion), each injector will be operated with an open duration determined by the tuning routine. In some examples, this may include each injector delivering the same quantity of liquid fuel. The misfire monitor may continue to operate in order to detect if misfire occurs in any of the cylinders. If misfire is detected, the open duration of the injector of the misfiring cylinder may be increased to stop the misfire. In some examples, the stored minimum open duration for that injector may be adjusted if future misfire is identified for that cylinder.

The tuning routine described above determines the minimum duration each injection may be opened during a fuel injection event and still sustain combustion while operating at a given set of parameters (e.g., an engine speed and load point where high gaseous fuel utilization is permitted). However, when the engine is operating at other engine speed and load points, misfire may result if the liquid fuel injectors are operated at the minimum open durations determined above. Thus, the tuning process described above may be performed for a variety of speed and load points, and the minimum injector open duration for each injector at each speed and load point may be determined. In this way, each cylinder may have an individual misfire limit determined for each engine operating point. This misfire limit may be above the absolute minimum amount of time each injector is capable of being opened for in some conditions, while in other conditions the misfire limit may be at or below the minimum amount of time each injector is capable of being opened for. After the tuning routine has been carried out for each speed and load point, when the engine enters a given speed and load range, the minimum liquid fuel injector open duration for that speed and load range may be identified for each injector, and each cylinder may be operated at a substitution ratio that provides a maximum possible gaseous fuel amount while meeting the desired power output and minimum liquid injector open duration.

Figure 5:
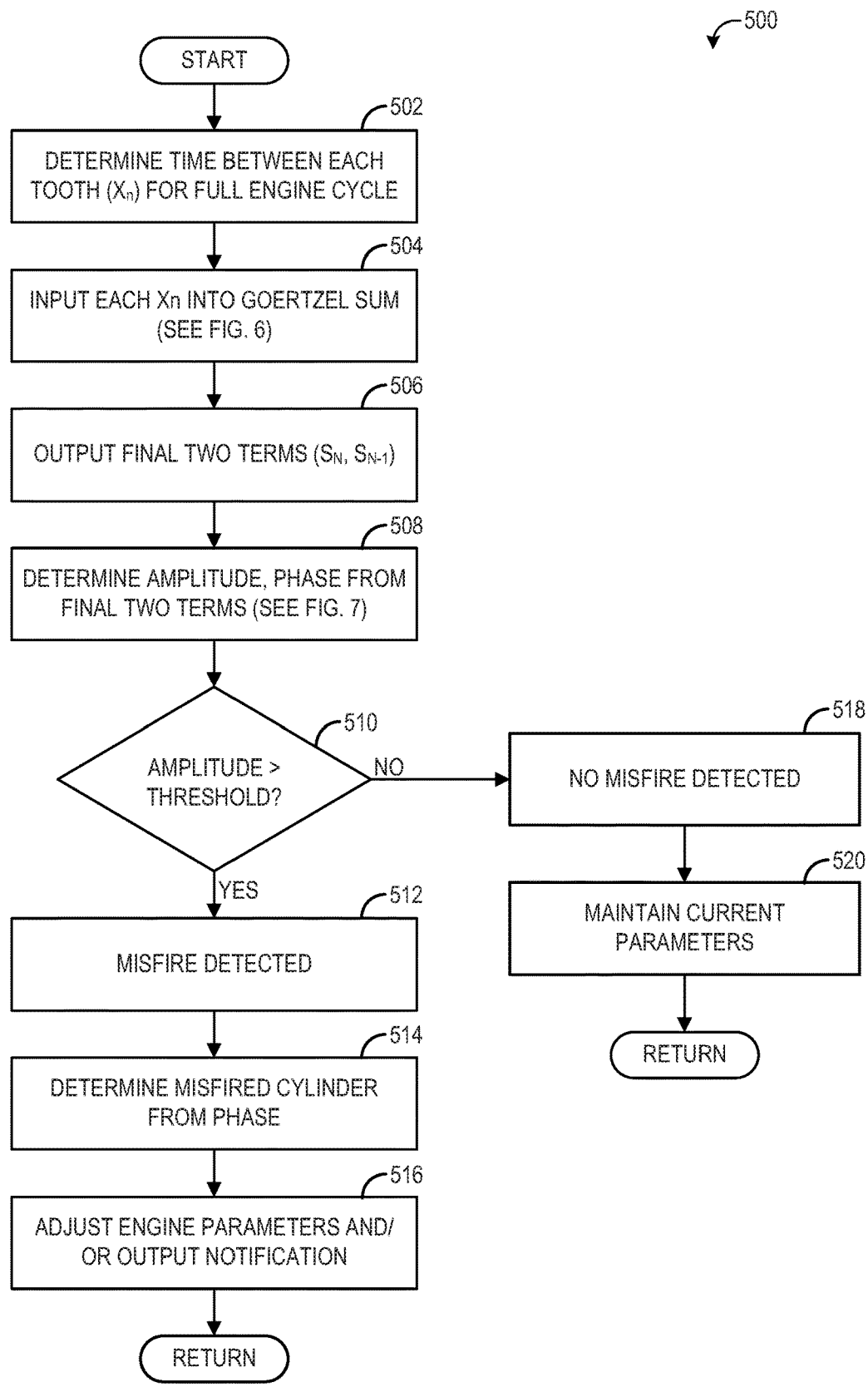
FIGS. 5-7 are flow charts illustrating a method for running a misfire monitor.

As explained above, a misfire monitor may be used in the tuning routine to detect misfiring cylinders. The misfire monitor may also be run during other engine operating events, and in some examples may be run during all engine operating events. FIG. 5 is a flow chart illustrating a method 500 for running a misfire monitor. Method 500 may be carried out a control unit, such as controller 110, according to non-transitory instructions stored thereon. In some examples, controller 110 may include multiple nodes, have a hierarchical organization, be capable of performing multi-threaded processing, and/or other configuration that may allow a portion of method 500 may be carried out by a first level of the controller, while another portion of method 500 may be carried out by a second, different level of the controller. Additional details about the multi-level process will be described below. Method 500 may detect half-order or higher torsion vibrations, alone or in combination. In one example, method 500 may only detect half-order torsional vibrations, for example when the engine is a four-stroke engine. In other examples, method 500 may detect first order torsional vibrations, for example when the engine is a two-stroke engine. Detection of other torsional vibration orders are within the scope of this disclosure.

At 502, method 500 includes determining an amount of time ($X_n$) between the passing of each tooth of a crankshaft wheel past a crankshaft sensor for a full engine cycle (e.g., two revolutions of the crankshaft). In one example, the crankshaft wheel may include a plurality of teeth, and the amount of time between when a first tooth and a second, adjacent tooth passes by the crankshaft sensor may be determined for each tooth of the wheel. In one example, the wheel may include 90 teeth, and thus approximately 180 $X_n$ samples may be collected in an engine cycle.

At 504, each value of $X_n$ is input into a recursive sum algorithm, such as a Goertzel sum. Additional details regarding the Goertzel sum is described below with respect to FIG. 6. Briefly, the Goertzel sum calculates a term ($S_n$) for each $X_n$ that is based on a previous two $X_n$ terms and a calibratable coefficient. At 506, the final two terms of the Goertzel sum, $S_N$ and $S_{N-1}$, are output and passed on to a model at 508, where they are used to determine an amplitude and phase. Additional details regarding this model are presented below with respect to FIG. 7. Briefly, the plurality of $X_n$ samples collected during the engine cycle represent a signal that may be processed to determine the amplitude and phase of the signal. Based on the amplitude, it may be determined if misfire is present, and if misfire is present, the phase of the signal may be used to determine which cylinder is misfiring.

Thus, at 510, method 500 includes determining if the amplitude is greater than a threshold amplitude. The threshold amplitude may be a suitable amplitude, such as an amplitude predetermined when no cylinders are misfiring. If the amplitude is greater than the threshold, method 500 proceeds to 512 to indicate that misfire is detected. At 514, method 500 optionally includes determining which cylinder misfired based on the phase of the signal calculated above. At 516, one or more engine operating parameters may be adjusted and/or a notification of the misfire may be output. For example, in response to detected misfire, a liquid fuel injection quantity may be increased, fuel injection timing may be adjusted, or other parameter may be adjusted. Further, the output notification may include notifying an operator of the vehicle in which the engine is installed via an indicator light, for example, or setting a diagnostic code. Method 500 then returns.

If the amplitude is not greater than the threshold at 510, method 500 proceeds to 518 to indicate that no misfire is detected and maintain current operating parameters at 520. Method 500 then returns.

Thus, method 500 monitors for cylinder misfire by analyzing torsional oscillations of the crankshaft created by the combusting cylinders. During operation with no misfire, the torsional oscillations are relatively low. However, if a cylinder is misfiring and thus not contributing to the torque of the crankshaft, higher order torsional oscillations may increase. These may be detected based on output from the crankshaft speed sensor.

As described above, the misfire monitor includes two portions, a first portion where the Goertzel sum is calculated on the collected crankshaft sensor output in order to output two terms, which are fed into the second portion of the misfire monitor, where the two terms are used to calculate a phase and amplitude to detect misfire and the cylinder in which the misfire is occurring. Each portion of the monitor may be performed on a different level of logic in the controller. For example, the first portion may be performed on a lower level and the second portion may be performed on a higher level. This may include performing the two portions on different nodes, or performing them in different threads of a multi-thread processor.

Figure 6:
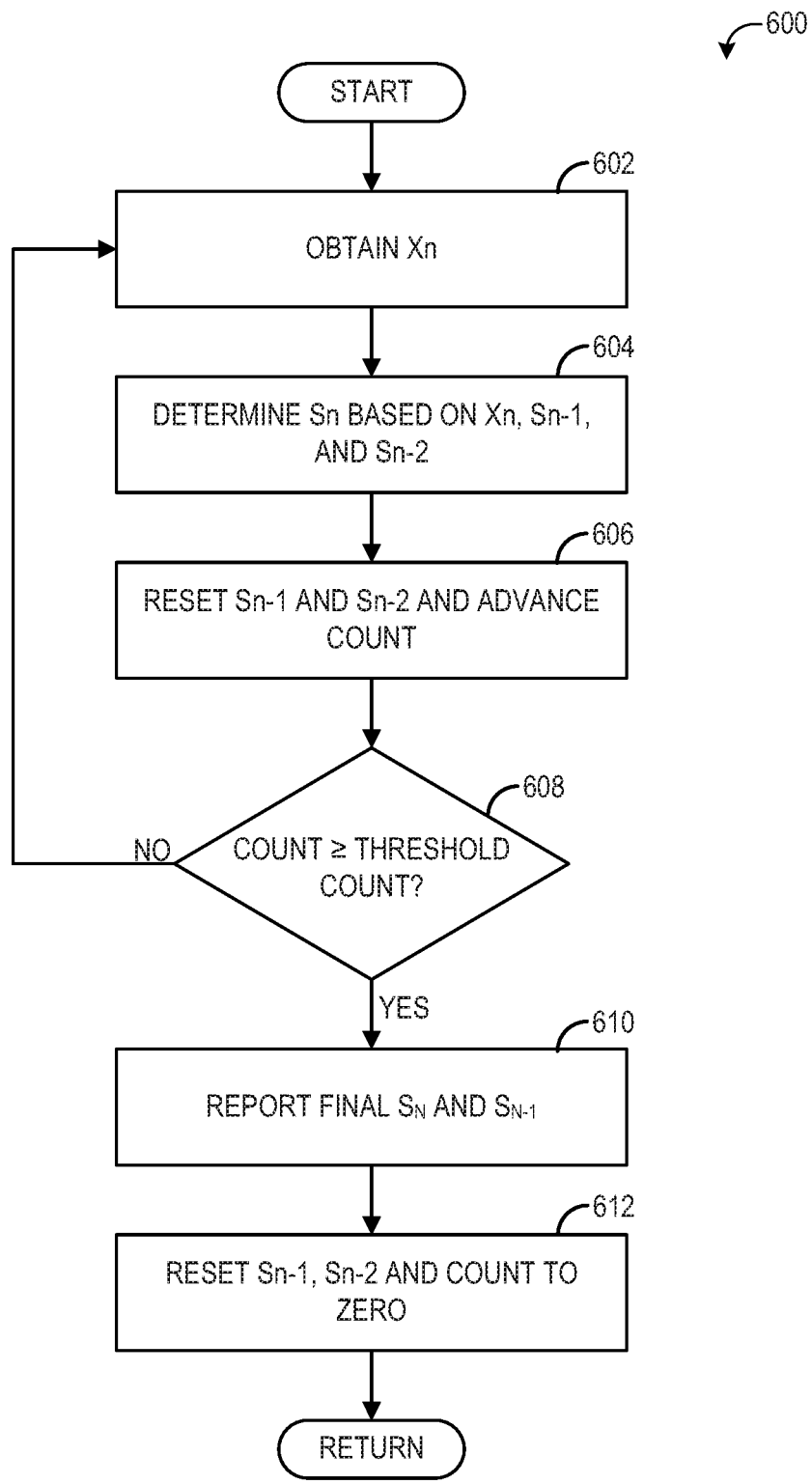
Figure 7:
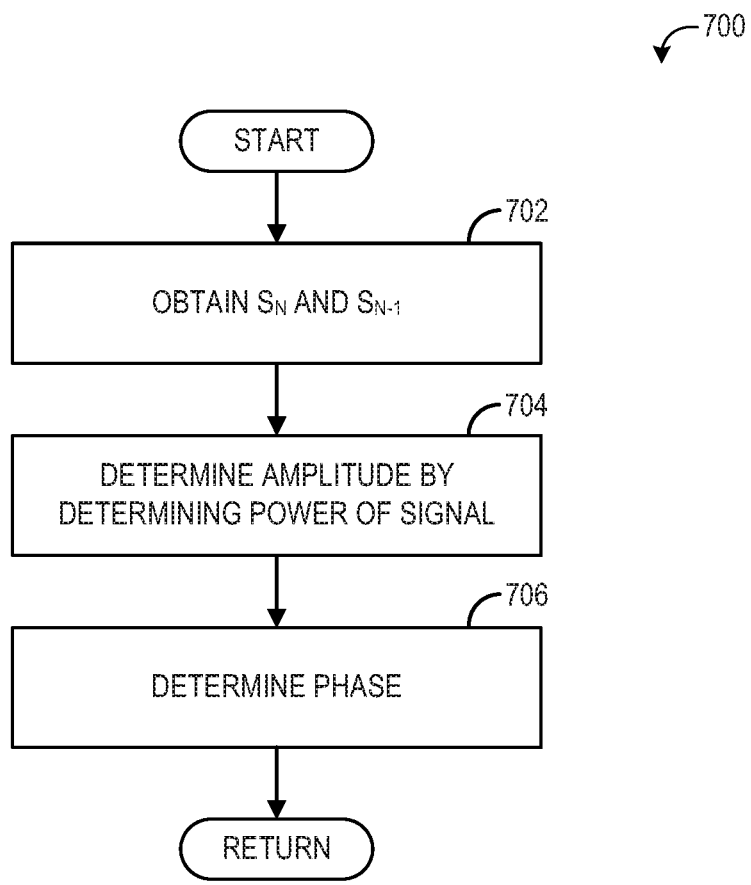

FIGS. 6-7 illustrate the recursive Goertzel algorithm described above in greater detail, which uses the variation in the existing crankshaft position sensor tooth time intervals to calculate the torsional oscillation orders of the engine crankshaft to measure engine operation. The Goertzel recursive sum is calculated between the passage of timing teeth in the lower level of the controller. After one engine cycle, the final two terms of the sum are reported to the higher level control for the calculation of order magnitude and phase, which can be used to identify weak and misfiring cylinders. Single weak or misfiring cylinders show an increased half-order torsional vibrations and multiple misfiring cylinders show increased first and higher orders in a four stroke engine.

Referring first to method 600 of FIG. 6, it illustrates the sample collection and recursive summation performed on the crankshaft sensor signal. As explained previously, the engine crankshaft has a timing wheel with evenly spaced teeth to control the injection of the fuel at the correct angular position of the engine. The passage of each tooth is read by the controller. Even though the teeth are evenly spaced, the time between teeth, DT(n) (also referred to $X_n$) varies due to the torsional oscillation of the crankshaft caused by the pulsating nature of individual cylinders firing and the elastic properties of the crankshaft. When all the cylinders fire evenly, their torque impulses into the crankshaft are fairly equal and the phase difference between the cylinders result in a low, net value of the lower torsional orders. When one cylinder's torque is lower or higher, then the rest of the torque values do not cancel out, and a higher net value of the crankshaft torsional orders can be calculated. It may be more efficient to calculate the Goertzel recursive sum terms between the passage of individual timing teeth in the lower part of the controller.

Thus, at 602, method 600 includes obtaining an $X_n$ value calculated as described above (e.g., the amount of time between when the crankshaft speed sensor detects a first tooth and when the sensor detects a second tooth, where the second tooth is the immediately adjacent tooth to the first tooth). At 604, a first term $S_n$ is determined based on $X_n$, $S_{n-1}$, and $S_{n-2}$. To determine $S_n$, the obtained $X_n$ value is entered into the equation $S_n = X_n + \text{Coeff}*S_{n-1} - S_{n-2}$, where the value of coeff depends on the order being calculated (e.g., half-order, first order, etc.) and where $S_{n-1}$ and $S_{n-2}$ are the prior two calculated $S_n$. After $S_n$ is calculated, $S_{n-1}$ is set to $S_{n-2}$, $S_n$ is set to $S_{n-1}$, and the sample count is incremented by one at 606. It is then determined at 608 if the sample count is equal to or greater than a threshold count. The threshold count may be the number of teeth that the sensor detects in one full engine cycle (e.g., two rotations of the crankshaft and thus two times the number of teeth on the wheel), or other suitable count that indicates enough data has been collected to enable a determination of the torsional vibration order(s). In one example where the wheel has 90 teeth, the count may be 180. If the count is not greater than the threshold count, method 600 loops back to 602 and $S_n$ is calculated for the next $X_n$. If the count is equal to or greater than the threshold count, the two final terms, $S_N$ and $S_{N-1}$, are output at 610, and all the values are reset to zero at 612 to start over for a next engine cycle. In this way, the sum is performed for all the teeth in two revolutions of the crankshaft, and then the amplitude is calculated (described below).

The last two sum terms, $S_N$ and $S_{N-1}$ are reported to higher level logic of the controller where the magnitude and phase of the torsional vibration order frequency are calculated for that engine cycle. The amplitude and/or phase can be used to measure the overall combustion roughness of the engine or to identify individual defective, weak, or misfiring cylinders. While the methods herein have been described with respect to determining the last two sum terms on the lower level of logic and reporting them to the higher level of logic for further processing, other configurations are possible. For example, the tooth data (e.g., amount of time between the passing of each tooth of the wheel) may passed from the lower level to the higher level, and all the calculations may be performed on the higher level.

FIG. 7 is a flow chart illustrating a method 700 for determining an amplitude and phase of the frequency analyzed in method 600. At 702, method 700 includes obtaining $S_N$ and $S_{N-1}$ from the lower level logic of the controller. As explained above with respect to FIG. 6, $S_N$ and $S_{N-1}$ are the final two terms output from the recursive Goertzel algorithm. As such, $S_N$ and $S_{N-1}$ represent the desired frequency component (e.g., half order) for the entire sampled signal, and include real and imaginary frequency components. The magnitude (e.g., amplitude) and phase of the signal can be determined from these two terms. Thus, at 704, the amplitude is determined based on a signal power determination. The two final terms are entered into an equation to calculate the amplitude:

$$Amp = ((S_N * w_r - S_{N-1})^2 + (S_N * w_i)^2)^{1/2} * 2/N$$

In the above equation, $W_r$ represents a real value of w (e.g., the cosine of w), where $w=(2\pi/N)*k$ and k is a constant based on a sample size, target frequency, and sample frequency. In the above equation, $W_i$ represents an imaginary value of w (e.g., the sine of w).

At 706, the phase may be calculated according to the following equation:

$$\text{Phase} = 720 - \text{MOD}(\text{ATAN } 2(S_N * w_r - S_{N-1}, S_N * w_i) * 2 + \textit{Off}, 720)$$

In the above equation, MOD may refer to a modulus function, ATAN 2 may refer to an arctangent with two arguments function, and Off may be an offset, which in one example may be based on the engine position at the start of the engine cycle. As described above, the amplitude may be compared to a threshold to determine if misfire is present. If misfire is present, the phase may indicate which cylinder misfired. In one example, if no misfire is present, the phase calculated above may be equal to zero. If misfire is present, the phase relative to the starting position of the engine may be used to determine which cylinder misfired.

In some examples, cylinder-to-cylinder variations in combustion may occur, where the variations are caused by variation in compression ratio, ring sealing, air-fuel ratio, deposits, etc., which will cause higher ½ order oscillations. The cylinder-to-cylinder variation will add to the variation caused by injector variation, so the crankshaft oscillation monitor may not be able to distinguish the cause of variation, but the remedies will be similar. For example, the liquid fuel level may be increased for individual cylinders or for the whole engine in general.

There may be a point where the injectors or cylinder conditions are so disadvantageous that the engine has to return to 100% liquid fuel or reduce power or shutdown in order to protect itself from further damage.

Furthermore, the torsional vibration crankshaft monitor may also detect gradual degradation in combustion quality. As the ignition of the gaseous fuel degrades, the cycle-to-cycle power variation for an individual cylinder and among all the cylinders in a multi-cylinder engine may increase. The term "Coefficient of Variation" (COV) is the standard deviation of the power output of the cylinders divided by the mean power output. The COV value can be monitored and optimized by adjusting the fuel duration to individual cylinders or the whole engine in general.

Figure 10:
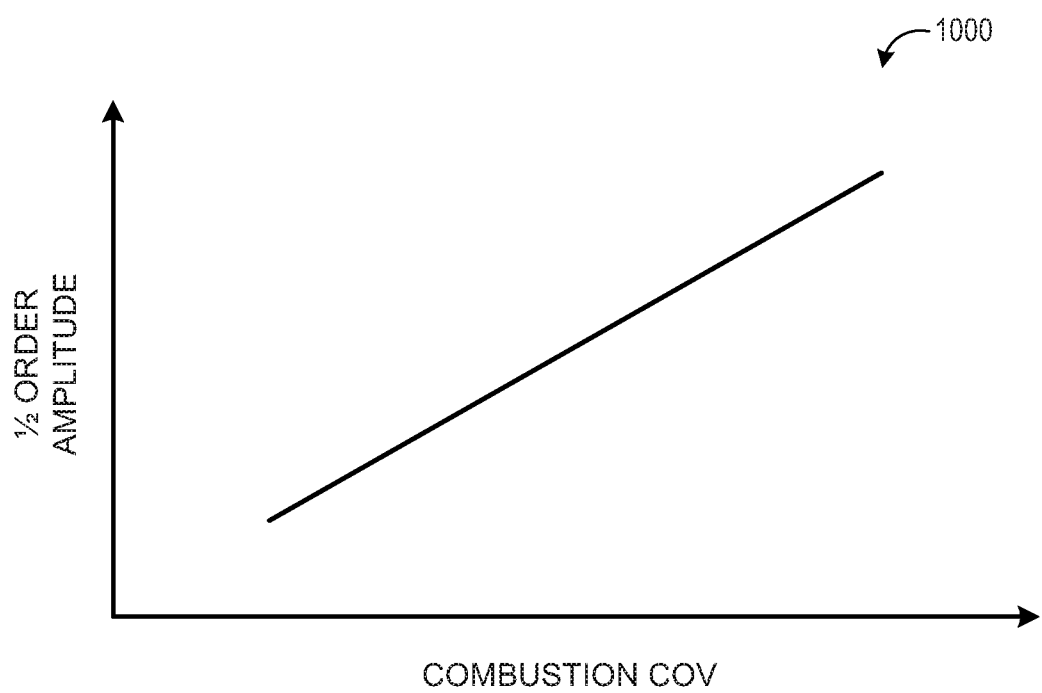
FIG. 10 is a graph illustrating ½ order amplitude as a function of combustion variation.
Figure 11:
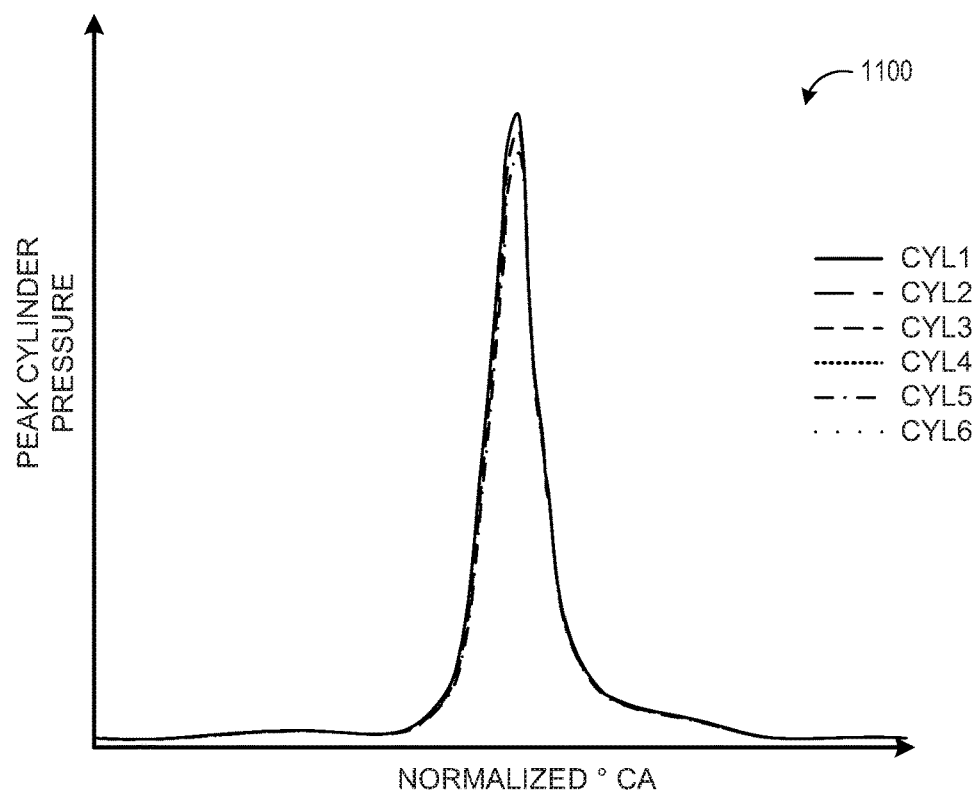
FIGS. 11-14 are graphs illustrating various parameters in an engine operating with either 2% combustion variation or 10% combustion variation.
Figure 12:
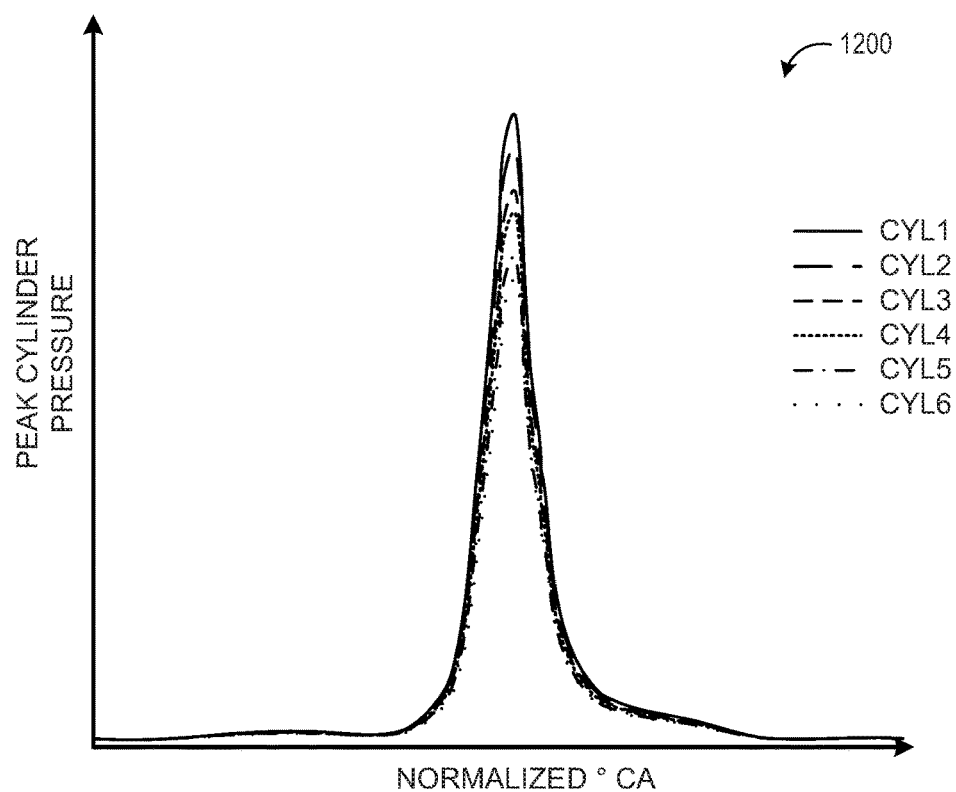
Figure 13:
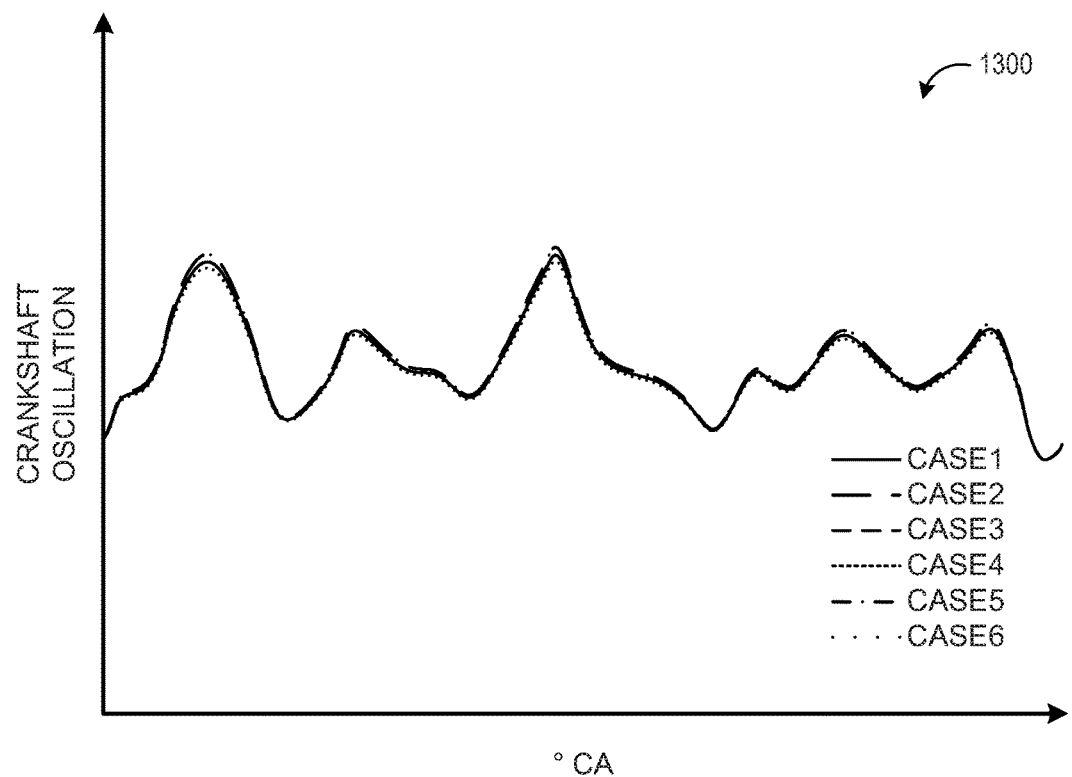
Figure 14:
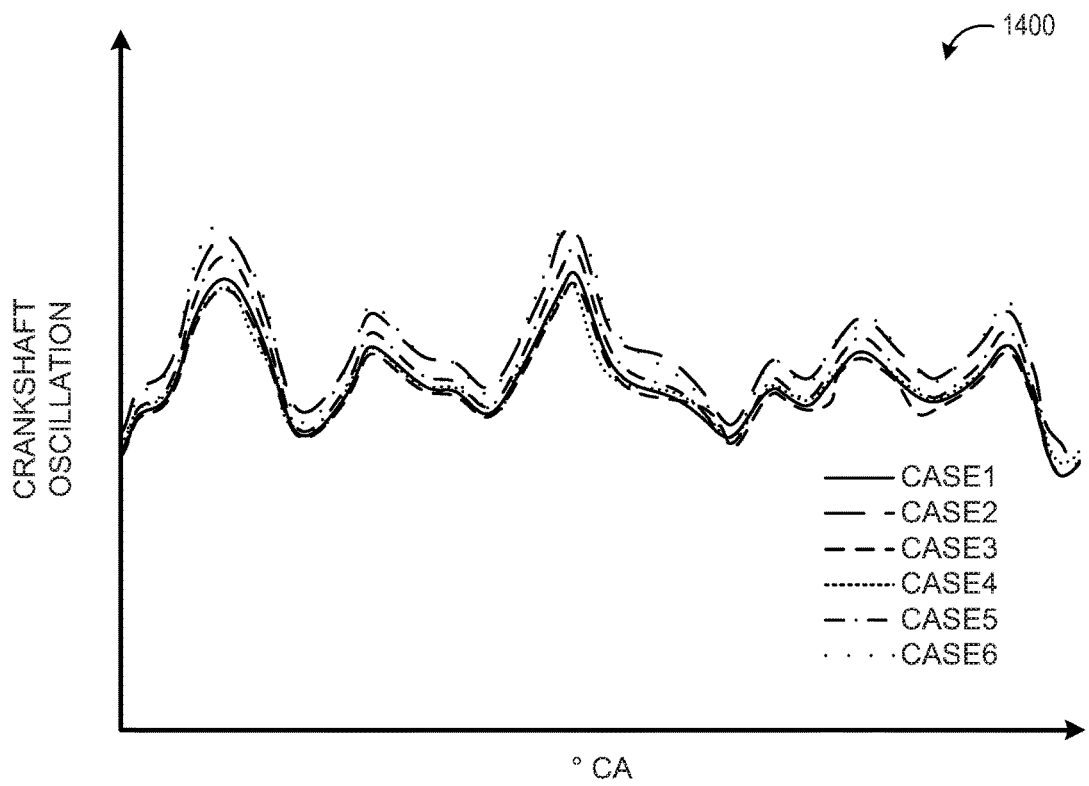

As shown by diagram 1000 of FIG. 10, the ½ order response is directly proportional to the combustion variation (e.g., linearly proportional). Further, as shown by FIGS. 11-14, the larger the COV, the greater the ½ order amplitude. For example, diagram 1100 of FIG. 11 shows the peak cylinder pressure for six cylinders of a 12-cylinder engine operating with 2% COV and diagram 1200 of FIG. 12 shows the peak cylinder pressure for each of the six cylinders when the engine is operating with 10% COV. When operating with 2% COV, the ½ order amplitude is equal to 0.025, while when operating at 10% COV, the ½ order amplitude is equal to 0.120. As can be seen in FIGS. 13-14, the crankshaft oscillation varies to a higher degree from engine cycle to engine cycle (e.g., cases 1-6) when the engine is operating with 10% COV (shown by diagram 1400 of FIG. 14), as compared to when the engine is operating with 2% COV (shown by diagram 1300 of FIG. 13).

An embodiment of a system comprises an engine having a plurality of cylinders with pistons coupled to a crankshaft; a crankshaft speed sensor; and a controller. The controller is configured to measure one or more torsional vibration orders of the engine based on signals from the crankshaft speed sensor; determine a phase and an amplitude of the one or more torsional vibration orders; and when the amplitude is greater than a threshold, indicate misfire in at least one of the plurality of cylinders. The controller may be further configured to, if misfire is indicated, determine which cylinder of the plurality of cylinders is misfiring based on the phase. The controller may be additionally or alternatively further configured to, if misfire is indicated, increase a fuel injection amount to the misfiring cylinder. The controller may additionally or alternatively be configured to determine a level of combustion variation among the plurality of cylinders based on the amplitude. The controller may be further configured to, when the level of combustion variation is greater than a threshold variation, adjust a fuel injection amount to one or more cylinders of the engine. The engine may be configured to operate with at least a first fuel and a second fuel. To increase the fuel injection amount to the misfiring cylinder, the controller may be configured to increase a fuel injection amount of the first fuel relative to the second fuel. The first fuel may be a liquid fuel and the second fuel may be a gaseous fuel. The controller may be configured to determine, for each cylinder of the plurality of cylinders, a misfire limit for each operating point of a plurality of operating points based on an amplitude of the one or more torsional vibration orders measured across the plurality of operating points. The misfire limit for a given cylinder of the plurality of cylinders may include a minimum open duration for a liquid fuel injector coupled to the given cylinder. The controller may be further configured to operate each cylinder of the plurality of cylinders at a respective predetermined ratio of gaseous fuel to liquid fuel, each predetermined ratio including a maximum amount of gaseous fuel to deliver requested engine output while remaining above a respective misfire limit.

An embodiment relates to a method comprising measuring one or more torsional vibration orders of an engine having a plurality of cylinders based on signals from a crankshaft speed sensor; determining a phase and an amplitude of the one or more torsional vibration orders; and if the amplitude is greater than a threshold, indicating misfire in at least one of the plurality of cylinders. The method may further include, if misfire is indicated, determining which cylinder of the plurality of cylinders is misfiring based on the phase. The method may additionally or alternatively include, if misfire is indicated, increasing a fuel injection amount to the misfiring cylinder. The method may additionally or alternatively include determining a level of combustion variation among the plurality of cylinders based on the amplitude. In one example, the one or more torsional vibration orders may include a half-order torsional vibration.

An embodiment relates to a system comprising an engine having a plurality of cylinders, the engine configured to operate with at least a first fuel and a second fuel; a plurality of fuel injectors to inject the first fuel to the plurality of cylinders; and a controller. The controller is configured to, when operating under a tuning mode, operate the engine with both the first fuel and the second fuel and determine a minimum open duration for each of the plurality of injectors that sustains combustion; and when operating under a second fuel mode, open each injector at its determined minimum open duration to initiate combustion. The minimum open duration for each of the plurality of injectors may be determined based on a misfire monitor that determines cylinder misfire based on signals from a crankshaft speed sensor. The system may additionally or alternatively include the first fuel being liquid fuel and the second fuel being gaseous fuel, and the controller may additionally or alternatively be configured to supply a gaseous fuel-air mixture to each cylinder during the second fuel mode. The system may additionally or alternatively include the tuning mode being performed at given engine speed and/or load, and the second fuel mode comprising engine operation at the given engine speed and/or load. In an example, each respective minimum open duration comprises the respective minimum open duration that does not cause cylinder misfire. The system may additionally or alternatively include the controller being configured to determine cylinder misfire with the misfire monitor by determining half-order torsional oscillation of a crankshaft of the engine based on the signals from the crankshaft speed sensor. In an example, a first injector of the plurality of fuel injectors has a first minimum open duration and a second injector of the plurality of fuel injectors has a second minimum open duration that is different than the first minimum open duration, and a quantity of fuel delivered by the first injector at the first minimum open duration is the same as a quantity of fuel delivered by the second injector at the second minimum open duration.

An embodiment relates to a method for a system, the system including an engine having a plurality of cylinders, the engine configured to operate with at least a first fuel and a second fuel, a plurality of fuel injectors to inject the first fuel to the plurality of cylinders, and a controller. The method comprises, when operating under a tuning mode, operating the engine with both the first fuel and the second fuel and determining a minimum open duration for each of the plurality of injectors that sustains combustion; and when operating under a second fuel mode, opening each injector at its determined minimum open duration to initiate combustion. The minimum open duration for each of the plurality of injectors may be determined based on a misfire monitor that determines cylinder misfire based on signals from a crankshaft speed sensor. The method may additionally or alternatively include the first fuel being liquid fuel and the second fuel being gaseous fuel and supplying a gaseous fuel-air mixture to each cylinder during the second fuel mode. The method may additionally or alternatively include the tuning mode being performed at given engine speed and/or load, and the second fuel mode comprising engine operation at the given engine speed and/or load. The method may additionally or alternatively include determining cylinder misfire with the misfire monitor by determining half-order torsional oscillation of a crankshaft of the engine based on the signals from the crankshaft speed sensor.

An embodiment relates to a system comprising an engine having a plurality of cylinders with pistons coupled to a crankshaft, a crankshaft speed sensor, and a controller. The controller is configured to measure half-order torsional vibration of the engine based on signals from the crankshaft speed sensor, determine a coefficient of variation (COV) of the plurality of cylinders based on the measured half-order torsional vibration, and adjust fuel duration to one or more of plurality of cylinders based on the COV. The COV may comprise a standard deviation of a power output of the plurality of cylinders divided by a mean power output. The controller may be further configured to determine the COV based on peak cylinder pressure for each of the plurality of cylinders. The engine may be configured to combust at least a first fuel and a second fuel, and to adjust the fueling duration to one or more of the plurality of cylinders, the controller may be configured to adjust fueling duration of the first fuel relative to the second fuel. The first fuel may be liquid fuel and the second fuel may be gaseous fuel.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   an engine having a plurality of cylinders, the engine configured to operate with at least a first fuel and a second fuel;
   a plurality of fuel injectors to inject the first fuel to the plurality of cylinders; and
   a controller configured to:
      when operating under a tuning mode, operate the engine with both the first fuel and the second fuel and determine a minimum open duration for each of the plurality of injectors that sustains combustion; and
      when operating under a second fuel mode, open each injector at its determined minimum open duration to initiate combustion,
      where the minimum open duration for each of the plurality of injectors is determined based on a misfire monitor that determines cylinder misfire based on signals from a crankshaft speed sensor, wherein each respective minimum open duration comprises the respective minimum open duration that does not cause cylinder misfire, and wherein the controller is configured to determine cylinder misfire with the misfire monitor by determining half-order torsional oscillation of a crankshaft of the engine based on the signals from the crankshaft speed sensor.

2. The system of claim 1, wherein the first fuel is liquid fuel and the second fuel is gaseous fuel, and where in the controller is configured to supply a gaseous fuel-air mixture to each cylinder during the second fuel mode.

3. The system of claim 2, wherein the tuning mode is performed at a given engine speed and/or load, and wherein the second fuel mode comprises subsequent engine operation at the given engine speed and/or load.

4. The system of claim 1, wherein a first injector of the plurality of fuel injectors has a first minimum open duration and a second injector of the plurality of fuel injectors has a second minimum open duration that is different than the first minimum open duration, and wherein a quantity of fuel delivered by the first injector at the first minimum open duration is the same as a quantity of fuel delivered by the second injector at the second minimum open duration.

5. A system comprising:
   an engine having a plurality of cylinders, each cylinder including a piston coupled to a crankshaft;
   a crankshaft speed sensor configured to measure a speed of the crankshaft; and
   a controller configured to:
      measure half-order torsional vibration of the engine based on signals from the crankshaft speed sensor;
      determine a coefficient of variation (COV) of cycle-to-cycle combustion variation across the plurality of cylinders based on an amplitude of the measured half-order torsional vibration; and
      adjust fueling duration to one or more of the plurality of cylinders based on the COV.

6. The system of claim 5, wherein the COV comprises a standard deviation of a power output of the plurality of cylinders divided by a mean power output and is linearly proportional to the amplitude of the measured half-order torsional variation.

7. The system of claim 6, wherein the controller is further configured to determine the COV based on peak cylinder pressure for each of the plurality of cylinders.

8. The system of claim 5, wherein the engine is configured to combust at least a first fuel and a second fuel, and wherein to adjust the fueling duration to one or more of the plurality of cylinders, the controller is configured to adjust fueling duration of the first fuel relative to the second fuel.

9. The system of claim 8, wherein the first fuel is liquid fuel and wherein the second fuel is gaseous fuel.

* * * * *